United States Patent [19]

Nishihama et al.

[11] Patent Number: 4,695,044
[45] Date of Patent: Sep. 22, 1987

[54] APPARATUS FOR SECURING A PHOTOSENSITIVE SHEET

[75] Inventors: Takamichi Nishihama; Kotaro Okada; Shigekazu Kadota, all of Shiga, Japan

[73] Assignee: Dainippon Screen Mfg. Co., Ltd., Kyoto, Japan

[21] Appl. No.: 856,936

[22] Filed: Apr. 25, 1986

[30] Foreign Application Priority Data

May 10, 1985 [JP] Japan .................................. 60-99976

[51] Int. Cl.$^4$ ............................................ B25B 11/00
[52] U.S. Cl. .................................................... 269/21
[58] Field of Search ........................ 269/21; 279/3 R; 51/235 R; 138/37; 181/264, 281

[56] References Cited

U.S. PATENT DOCUMENTS

| | | | |
|---|---|---|---|
| 631,898 | 8/1899 | Marsh | 51/235 |
| 668,953 | 2/1901 | Dawson | 138/37 |
| 1,474,115 | 11/1923 | Heather | 181/281 |
| 2,855,653 | 10/1958 | Kastenbein | 51/235 |
| 3,976,288 | 8/1976 | Cuomo, Jr. | 269/21 |

Primary Examiner—Frederick R. Schmidt
Assistant Examiner—Judy J. Hartman
Attorney, Agent, or Firm—Lowe, Price, Leblanc, Becker & Shur

[57] ABSTRACT

An apparatus for securing a sheet material under suction, the apparatus comprising: a face plate including a number of pores adapted to allow air to pass through, a base plate including outlet ports, corrugated plate interlocated between the face plate and the base plate, the corrugated plate including hill portions and valley portions alternately produced, each hill portion and valley portion taking the form of rectangles produced concentrically of the base plate, the corrugated plate further including inlet grooves between one hill portion and the next, and outlet grooves between one valley portion and the next, each outlet groove including one outlet port in the base plate, the inlet grooves and the outlet grooves being communicated with each other through a port produced in the partition wherein the port is located at a point distant from the outlet ports.

3 Claims, 9 Drawing Figures

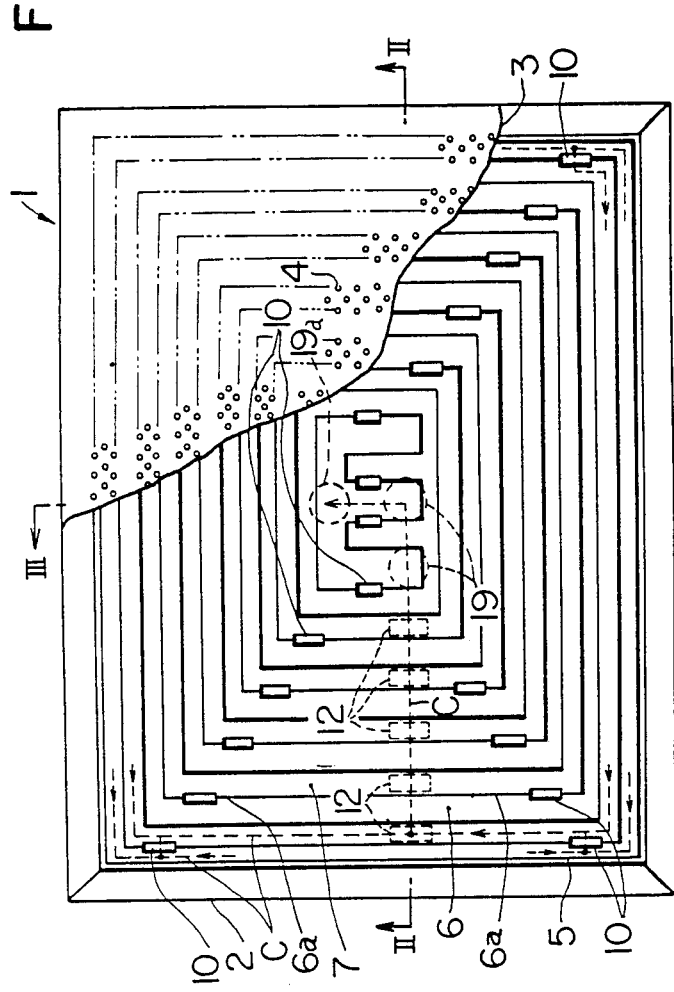
Fig. 1
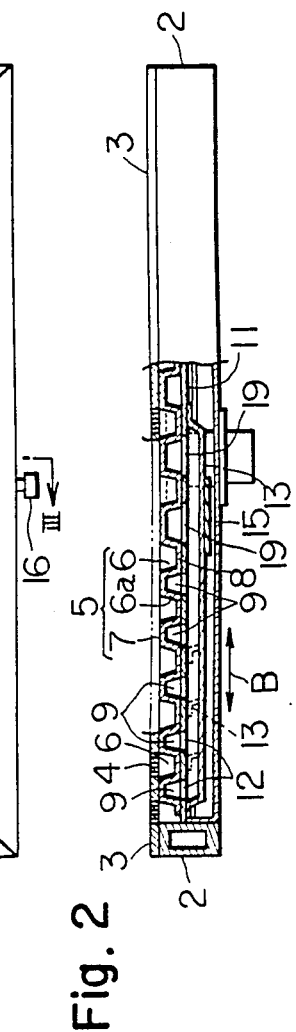
Fig. 3
Fig. 2

APPARATUS FOR SECURING A PHOTOSENSITIVE SHEET

BACKGROUND OF THE INVENTION

The present invention relates to an apparatus for securing a sheet material, such as a photosensitive sheet, hereinafter referred to as a sheet, and more particularly, an apparatus for securing a sheet under suction, adaptable for use in combination with a process camera, a step-and-repeat machine, an automatic drafting machine, or the like.

Referring to FIG. 9, which shows a vertical type process camera to which the present invention is to be applied, the reference numeral 1 denotes a sheet holding unit, which includes an upper plate 1a on which a sheet 21 is placed. The upper plate 1a is rotatable around a pivot 22 in the direction of arrow (A), with holding of the sheet 21 thereon by suction. In this way, the sheet 21 is positioned upside down at a focal plane 23, at which the sheet surface is exposed to light from an optical system 24.

The prior art apparatus includes a base plate 110 shown in FIGS. 7 and 8, which includes a plurality of rectangular valley portions 60 and hill portions 70 both produced concentrically of the base plate 110. Each valley portion 60 includes an outlet port 120.

A face plate 30 is placed on the base plate 110 (strictly on the hill portions 70), the face plate having a number of suction pores 40 through which air is admitted in the base plate 110 (strictly in the valley portions 60). The reference numeral 130 denotes a communicating path means through which the air is drawn into a discharge 140 under suction by a sucking means (F), the communicating path means 130 is slidable in the direction of arrows (B) for being adjustable the area of the suction zone in accordance with the size of the sheet 21. In this way the sheet is secured on the face plate 30 regardless of its size.

However, because of the arrangement in which the outlet ports 120 in the base plate 110 are in direct contact with the respective valley portions 60, no substantial resistance acts on the flow of air. If the sheet is too small to cover all the suction pores 40, a corresponding leakage of air is inevitable through the suction pores out of the coverage by the sheet. As a result the negative pressure in the valley portions 60 corresponding to the sheet-free suction pores tends to drop. The negative pressure is defined as pressure, given by the absolute value of the difference between the atmospheric pressure and the pressure in the objective place, and here it is identified within the valley portion 60. A negative pressure results from the suction applied through the suction pores 40 because of the low pressure in the valley portion as compared with the atmospheric pressure. The leakage of air through the suction pores 40 causes a drop in the negative pressure in the communicating path means 130, thereby reducing the effective pressure for securing the sheet on the area of suction zone.

If the negative pressure in the base plate 110 is not sufficient for securing the sheet on the face plate, the sheet is likely to fall off. In order to avoid the falling off of the sheet it is required to use other means for covering the pores out of the coverage by the sheet. In addition, the prior art base plate is heavy because of the solid planar body. The base plate is usually made of cast aluminum, and a heavy base plate causes inconvenience in handling it.

OBJECTS AND SUMMARY OF THE INVENTION

The present invention aims at solving the problems pointed out above, and has for its object to provide an apparatus for securing a sheet on the face plate under suction, wherein sucking pressure can be maintained for holding the sheet on the face plate regardless of a drop in the pressure because of the presence of suction pores in the face plate out of the coverage by the sheet.

Other objects and advantages of the present invention will become apparent from the detailed description given hereinafter; it should be understood, however, that the detailed description and specific embodiment are given by way of illustration only, since various changes and modifications within the spirit and scope of the invention will become apparent to those skilled in the art from this detailed description.

According to the present invention, the sheet holding apparatus is constructed of four side frames, a face plate, a corrugated plate and a base plate, which in which a corrugated plate, supports the face plate from underneath, is fixed between the face plate and the base plate. A thin box is made of the side plate, the face plate and the base plate. The face plate is provided with a number of suction pores which communicate to only the inlet grooves but not to the outlet grooves. The corrugated plate is fixed between the face plate and the base plate, providing the inlet grooves and the outlet grooves alternatively, corresponding to valley portions and hill portions, respectively. The valley portions are constructed in the form of flat rectangles concentrically on the base plate so that these portions keep contact with the upper surface of the base plate. The hill portion is also constructed in a similar way to the valley portions so as to keep contact with the lower surface of the face plate. The inlet grooves communicate with the suction pores in the face plate and each outlet groove is connected to the outlet ports which is provided in the base plate. Each inlet groove and outlet groove is constructed in a separated route by a partition of the corrugated plate, except for communication ports through which every inlet groove is kept in contact with the neighboring outlet grooves of one side. The communication port locations must be chosen to ensure sufficient distance from each suction pore to the outlet ports taken. Preferably, the communication ports are located near each corner of the hill portion. A shifter, which connected to the suction zone switching device, is attached underneath the outlet ports.

BRIEF DESCRIPTION OF THE DRAWINGS

FIG. 1 is a plan view showing an apparatus embodying the present invention;

FIG. 2 is a cross-sectional view taken along the line II—II in FIG. 1;

FIG. 3 is a cross-sectional view taken along the line III—III in FIG. 1;

DETAILED DESCRIPTION OF THE INVENTION

Figure 4:
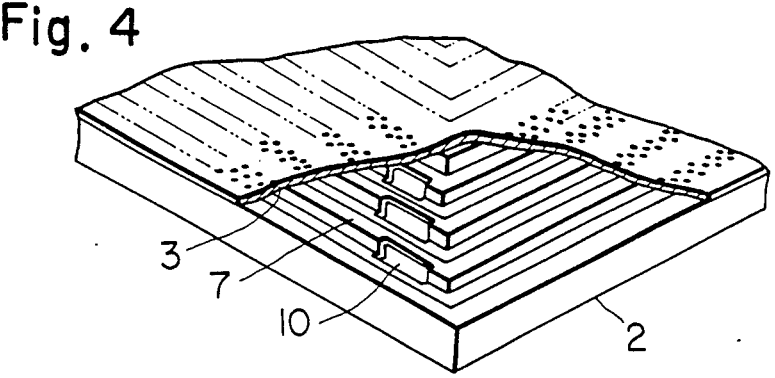
FIG. 4 is a perspective view showing an internal structure of the apparatus of FIG. 1.

Referring to FIGS. 1 to 6, the sheet holding apparatus 1 includes four side frames 2, a face plate 3 on which a sheet is secured under suction, a corrugated plate 5 supporting the face plate from underneath, and a base plate 11.

The side plates 2, the face plate 3 and the base plate 11 constitute a thin box in which the corrugated plate 5 is fixed e.g., with an adhesive. The face plate 3 is provided with a number of suction pores 4 through which air is passed. The corrugated plate 5 is intended to provide air paths communicating with the suction pores 4 in the face plate 3. The corrugated plate 5 includes hill portions 7 and valley portions 8 alternately produced, wherein the reference numerals 6 and 9 denote inlet grooves and outlet grooves produced therebetween. The hill portions 7 and the valley portion 8 keep contact with the undersurfaces of the face plate 3 and the base plate 11, respectively. The inlet grooves 6 communicate with the suction pores 4 in the face plate, and the outlet grooves 9 communicate with outlet ports 12 produced in the base plate 11. Each outlet groove 9 has one outlet port 12, wherein the outlet ports are situated at corresponding positions throughout the outlet grooves. Each hill portion 7 and inlet groove 6 are separated by a partition 6a having a communication port 10, which is taken enough distance from the outlet ports 12 for preventing loss of suction pressure when the communication ports 10 communicate with the grooves 6 and 9.

Through the suction pores 4 in the face plate 3, air is introduced into the inlet grooves 6, the communication ports 10, the outlet grooves 9, and the outlet ports 12, and eventually a power suction means (F) through a shifter 13, which will be described below. The flowing path of air can be passed as indicated by dotted lines (C) in FIG. 1. The outlet grooves 9 work as a resistor to the flow of air, thereby relieving the rate of flow.

The shifter 13 is connected underneath the outlet ports 12 provided in the base plate 11, as best shown in FIG. 2 wherein the reference numeral 14 denotes a suction zone switching device.

Figure 5:
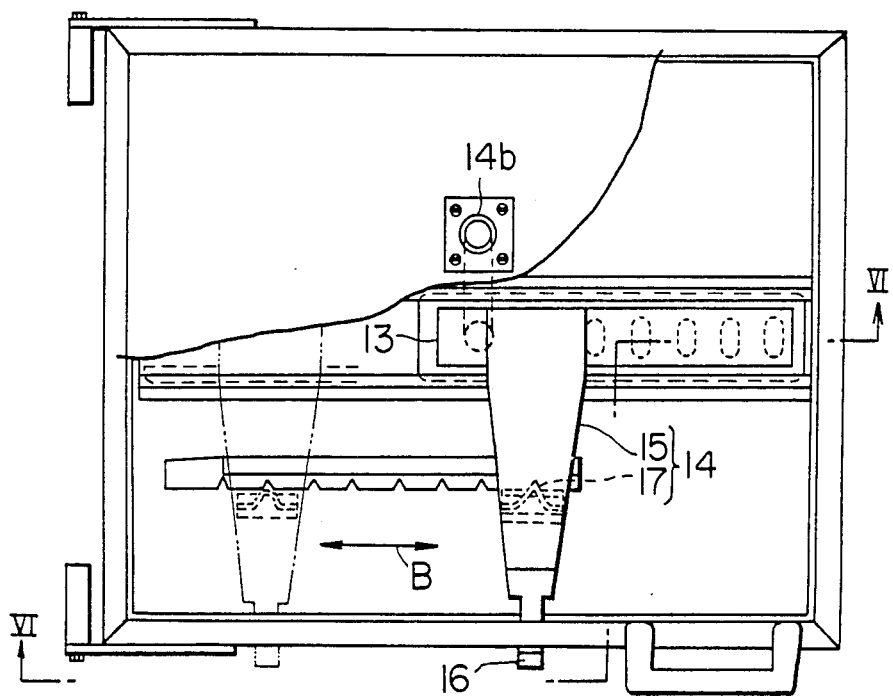
FIG. 5 is a rear view of the apparatus of FIG. 1.
Figure 6:
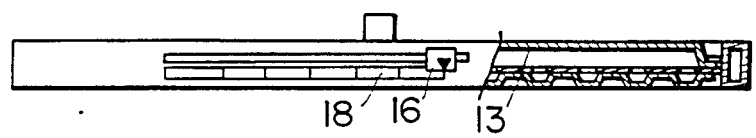
FIG. 6 is a cross-sectional view taken along the line VI—VI in FIG. 5.
Figure 7:
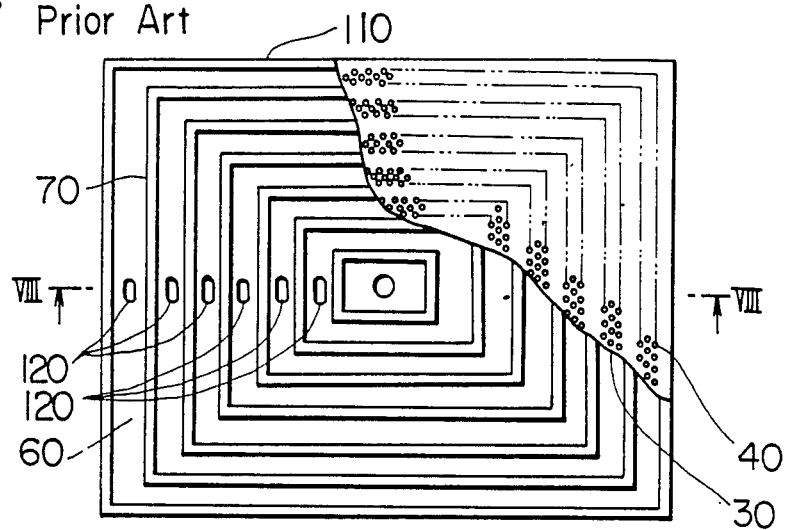
FIG. 7 is a plan view showing a prior art apparatus.
Figure 8:
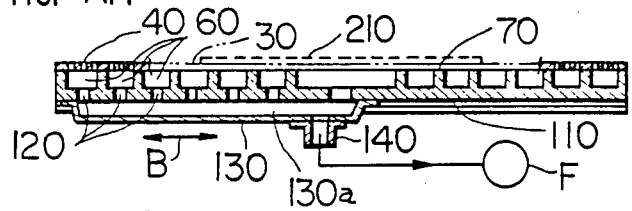
FIG. 8 is a cross-sectional view taken along the line VIII—VIII in FIG. 7.
Figure 9:
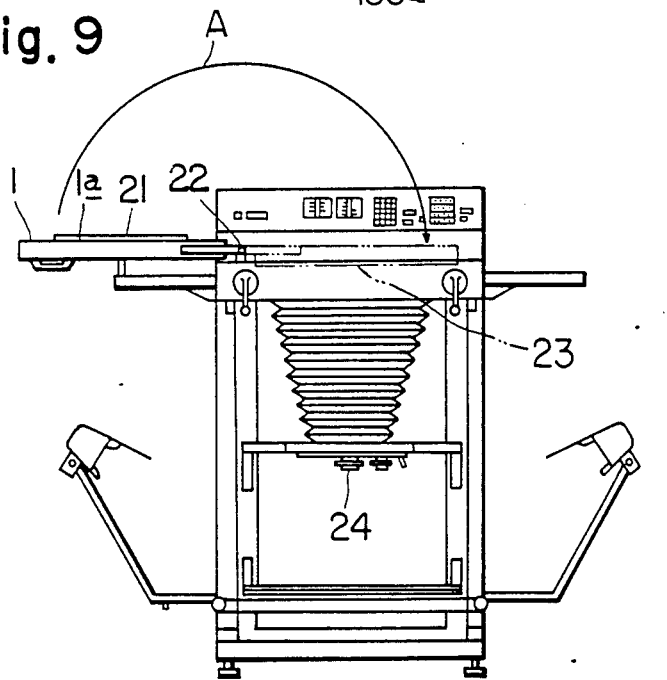
FIG. 9 is a front view showing a photographic copying machine equipped with the apparatus of FIG. 7.

The switching device 14 is to switch one suction zone to another by moving the shifter 13 in the direction of arrow (B) in accordance with the size of the sheet. As shown in FIGS. 5 and 6, the shifter 13 includes a plate 15 having a knob 16, a stopper 17 for fixing the plate 15, and a scale 18 by which a switching position is visually ascertained. With the knob 16, the switching device 14 is manipulated so as to shift the shifter 13 to and fro as desired, thereby allowing air to escape optionally through circular discharges 19 alone or the discharge 19 and the selected outlet ports 12 or the discharges 19 and all the outlet ports 12. In this way, the suction zones can be selected depending on operational exigencies. Accordingly, the outlet ports 12 are communicated with the inlet grooves 6 through the outlet grooves 9, thereby ensuring that the suction zone is determined in accordance with the size of the sheet.

In FIG. 3 the reference numerals 20, 14b and 14c denote a cover, a joint and an intermediate joint, respectively.

In the illustrated embodiment, the shifter 13 is connected to the switching device 14, but since this embodiment has the outlet grooves 9 located between the inlet grooves 6 and the outlet ports 12, the switching device 14 is not necessarily required.

The present invention is applicable not only to a process camera but also to other machines, such as a step-and-repeat machine or an automatic drafting machine, in which a sheet is secured under suction.

The present invention has many advantages, as follows:

(1) The sheet is secured under suction imparted thereto regardless of the size of the sheet, by preventing loss of suction pressure even if the air leaks because of an inadequate placement of the sheet for the suction zone or the use of a non-standard size of sheet.

(2) The corrugated plate is full of depressions in the form of the inlet and outlet grooves 6 and 9, thereby reducing its weight.

(3) When the suction zone switching device is provided, the leakage of air through the suction pores in the face plate is minimized, thereby securing the sheet on the face plate.

As evident from the foregoing description, the outlet ports 12 in the base plate 11 communicate with the outlet grooves 9 in the corrugated plate, and the adjacently situated inlet and outlet grooves are mutually communicated through the port 10, which is situated away from the outlet ports 12. In this arrangement, the outlet grooves are effectively resistant to the flow of air from the face plate 3. This ensures that the negative pressure inside the corrugated plate is kept constant even if a drop in the pressure occurs in the inlet grooves which are not covered by the sheet. The leakage of air is unavoidable through gaps between the face plate and the sheet placed thereon, but the amount is negligible, so that there is enough exertive effect of the resistance to the flow of air occurring under suction.

It is possible to increase the number of the communication port 10 in the partition 6a, so as to ensure that the sucking force is evenly distributed against the face plate. The corrugated plate constitutes virtually a hollow body of the sheet holding apparatus with a number of grooves alternately produced, thereby leading to a lightweight structure.

We claim:

1. An apparatus for securing a sheet material under suction, the apparatus comprising: a face plate including a number of suction pores adapted to allow air to pass through, a base plate including outlet ports, corrugated plate interlocated between the face plate and the base plate, the corrugated plate including hill portions and valley portions alternately produced, each hill portion and valley portion taking the form of rectangles produced concentrically of the base plate, the corrugated plate further including inlet grooves between one hill portion and another, and outlet grooves between one valley portion and another, each outlet groove including one outlet port in the base plate, the inlet grooves and a outlet grooves being communicated with each other through a communication port produced in the partition wherein the port is located at a point distant from the outlet ports; and means for communicating the outlet grooves with a power suction means.

2. An apparatus as defined in claim 1, wherein the communication port communicating between the inlet grooves and the outlet grooves is located near each corner of the hill portions.

3. An apparatus as defined in claim 1, wherein the means for communicating between outlet grooves and a power suction means is shiftable so that the suction zone is selected in accordance with the extent of coverage of suction pores in the face plate by the sheet.

* * * * *